(12) United States Patent
Ishii et al.

(10) Patent No.: US 12,252,318 B2
(45) Date of Patent: Mar. 18, 2025

(54) GAS-BARRIER LAMINATE AND PACKAGING BAG

(71) Applicant: TOPPAN Holdings Inc., Tokyo (JP)

(72) Inventors: Rika Ishii, Tokyo (JP); Junichi Kaminaga, Tokyo (JP); Yoshiki Koshiyama, Tokyo (JP); Yumiko Kojima, Tokyo (JP)

(73) Assignee: TOPPAN Holdings Inc., Tokyo (JP)

( * ) Notice: Subject to any disclaimer, the term of this patent is extended or adjusted under 35 U.S.C. 154(b) by 4 days.

(21) Appl. No.: 18/004,242

(22) PCT Filed: Jun. 11, 2021

(86) PCT No.: PCT/JP2021/022333
§ 371 (c)(1),
(2) Date: Jan. 4, 2023

(87) PCT Pub. No.: WO2022/009608
PCT Pub. Date: Jan. 13, 2022

(65) Prior Publication Data
US 2023/0242314 A1 Aug. 3, 2023

(30) Foreign Application Priority Data
Jul. 9, 2020 (JP) .................................. 2020-118631

(51) Int. Cl.
*B65D 65/42* (2006.01)
*B65D 30/08* (2006.01)
(Continued)

(52) U.S. Cl.
CPC .............. *B65D 65/42* (2013.01); *B65D 31/02* (2013.01); *B65D 31/10* (2013.01); *B65D 81/24* (2013.01);
(Continued)

(58) Field of Classification Search
CPC ........ B65D 65/42; B65D 31/02; B65D 31/10; B65D 81/24; B65D 2565/385; B65D 2565/387
(Continued)

(56) References Cited

U.S. PATENT DOCUMENTS
2011/0132975 A1 6/2011 Toft et al.

FOREIGN PATENT DOCUMENTS
JP 2000-168770 A 6/2000
JP 2011-143714 A 7/2011
(Continued)

OTHER PUBLICATIONS

International Search Report (Form PCT/ISA/210); mailed Jul. 6, 2021 in corresponding PCT Application No. PCT/JP2021/022333 (4 pages) (3 pages English Translation).
(Continued)

*Primary Examiner* — Peter N Helvey
(74) *Attorney, Agent, or Firm* — Studebaker Brackett PLLC

(57) ABSTRACT

Provided is a gas barrier laminate including: a paper substrate; an anchor coat layer including a first polyolefin having a polar group; a vapor-deposited layer; and an overcoat layer including a second polyolefin having a polar group, in order, in which the gas barrier laminate includes a layer including a polyvinyl alcohol-based resin between the paper substrate and the anchor coat layer or between the anchor coat layer and the vapor-deposited layer.

17 Claims, 2 Drawing Sheets

(51) Int. Cl.
   *B65D 30/20*   (2006.01)
   *B65D 81/24*   (2006.01)
(52) U.S. Cl.
   CPC .. *B65D 2565/385* (2013.01); *B65D 2565/387* (2013.01)
(58) Field of Classification Search
   USPC .......................................................... 383/113
   See application file for complete search history.

(56) References Cited

FOREIGN PATENT DOCUMENTS

| JP | WO 2013/122103 | * | 8/2013 |
|---|---|---|---|
| JP | 2016-124565 | * | 7/2016 |
| JP | 2016-124565 A | | 7/2016 |
| JP | 2018-533506 A | | 11/2018 |
| JP | 2020-044713 | * | 3/2020 |
| JP | 2020-044713 A | | 3/2020 |
| JP | 2020-069783 A | | 5/2020 |
| WO | 2012/133687 A1 | | 10/2012 |
| WO | 2013/122103 A1 | | 8/2013 |
| WO | 2017/072120 A1 | | 5/2017 |

OTHER PUBLICATIONS

Written Opinion (Form PCT/ISA/237); mailed Jul. 6, 2021 in corresponding PCT Application No. PCT/JP2021/022333 (4 pages) (4 pages English Translation).

Notification of Transmittal of Translation of the International Preliminary Report on Patentability (Form PCT/IB/338); mailed Jan. 19, 2023 in corresponding PCT Application No. PCT/JP2021/022333 (1 page).

International Preliminary Report on Patentability (Form PCT/IB/373); mailed Jan. 10, 2023 in corresponding PCT Application No. PCT/JP2021/022333 (1 page).

Extended European Search Report issued in counterpart European Application No. 21836844.7 dated May 23, 2024.

\* cited by examiner

GAS-BARRIER LAMINATE AND PACKAGING BAG

CROSS REFERENCE TO RELATED APPLICATIONS

This application is a 35 USC 371 U.S. national phase application of International Application No. PCT/JP2021/022333, filed on Jun. 11, 2021, which claims the priority benefit to Japanese Application No. P2020-118631, filed on Jul. 9, 2020. The International Application and the Japanese Application are incorporated by reference herein in their entirety.

TECHNICAL FIELD

The present invention relates to a gas barrier laminate and a packaging bag.

BACKGROUND ART

In many fields such as foods, beverages, pharmaceuticals, and chemicals, various packaging materials are used according to the contents of each product. Packaging materials are required to have properties for preventing transmission of oxygen, water vapor, and the like (gas barrier properties), which cause degeneration of the contents.

In recent years, in view of growing environmental awareness stemming from marine plastic debris problems and the like, the momentum toward plastic reduction is building up. From the viewpoint of reducing the amount of use of plastic materials, it has been investigated to use paper instead of plastic materials in a variety of fields. For example, in the following Patent Literature 1, a gas barrier laminate in which barrier layers are laminated on paper is disclosed.

CITATION LIST

Patent Literature

Patent Literature 1: Japanese Unexamined Patent Publication No. 2020-69783

SUMMARY OF INVENTION

Technical Problem

Since paper has crease retaining properties (also referred to as dead holding properties), paper has a feature that processing is easy. However, according to an investigation of the inventors of the present invention, it has been found that in a case where packaging bags having more acute-angled creases (pillow packaging, three-sided seal packaging, and gusset packaging) are used, there is still room for improvement from the viewpoint that cracks are generated in the barrier layer so that the gas barrier properties are deteriorated.

Furthermore, from the viewpoint of the Law for Promotion of Effective Utilization of Resources, it has been required to reduce the amount of use of plastic materials even in gas barrier laminates.

The present invention was achieved in view of the above-described circumstances, and it is an object of the invention to provide a gas barrier laminate that has crease retaining properties, which is a feature of paper, has sufficient gas barrier properties even after being folded, and contributes to a reduction in the amount of use of plastic materials, and to provide a packaging bag including this gas barrier laminate.

Solution to Problem

The present invention provides a gas barrier laminate including: a paper substrate; an anchor coat layer including a first polyolefin having a polar group; a vapor-deposited layer; and an overcoat layer including a second polyolefin having a polar group, in order, in which the gas barrier laminate includes a layer including a polyvinyl alcohol-based resin between the paper substrate and the anchor coat layer or between the anchor coat layer and the vapor-deposited layer.

A first polyolefin having a polar group may have at least one selected from a carboxyl group, a salt of a carboxyl group, a carboxylic acid anhydride group, and a carboxylic acid ester.

A second polyolefin having a polar group may have at least one selected from a carboxyl group, a salt of a carboxyl group, a carboxylic acid anhydride group, and a carboxylic acid ester.

The first polyolefin having a polar group may be a copolymer of an acrylic acid ester and maleic anhydride.

The first polyolefin having a polar group may be an ethylene-vinyl acetate copolymer.

The first polyolefin having a polar group may be an ethylene-glycidyl methacrylate copolymer.

The second polyolefin having a polar group may be a copolymer of an acrylic acid ester and maleic anhydride.

The second polyolefin having a polar group may be an ethylene-vinyl acetate copolymer.

The second polyolefin having a polar group may be an ethylene-glycidyl methacrylate copolymer.

A thickness of the anchor coat layer may be 1 μm or more and 5 μm or less.

A thickness of the layer including the polyvinyl alcohol-based resin may be 1 μm or more and 5 μm or less.

A thickness of the vapor-deposited layer may be 30 nm or more and 100 nm or less.

A thickness of the overcoat layer may be 2 μm or more and 10 μm or less.

A thickness of the paper substrate may be 30 μm or more and 100 μm or less, and the thickness of the paper substrate may be 70% or more of the thickness of the entire gas barrier laminate.

A weight of paper may be 50% by mass or more based on the entire gas barrier laminate.

The present invention also provides a packaging bag including the above-described gas barrier laminate according to the present invention.

The packaging bag may have a folding part.

Advantageous Effects of Invention

According to the present invention, a gas barrier laminate that has crease retaining properties, which is a feature of paper, has sufficient gas barrier properties even after being folded, and contributes to a reduction in the amount of use of plastic materials, and a packaging bag including this gas barrier laminate can be provided.

DESCRIPTION OF EMBODIMENTS

Hereinafter, embodiments of the present invention will be described in detail with reference to the drawings as necessary. However, the present invention is not intended to be limited to the following embodiments.

<Gas Barrier Laminate>

Figure 1:
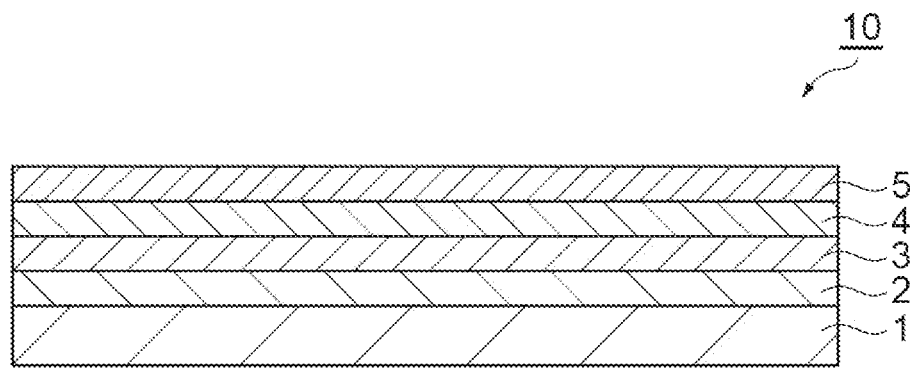
FIG. 1 is a schematic cross-sectional view illustrating a gas barrier laminate according to an embodiment of the present invention.

FIG. 1 is a schematic cross-sectional view illustrating a gas barrier laminate according to an embodiment. A gas barrier laminate 10 according to an embodiment includes a paper substrate 1, an anchor coat layer 2, a layer 3 including a polyvinyl alcohol-based resin, a vapor-deposited layer 4, and an overcoat layer 5, in order. Since both the anchor coat layer 2 and the layer 3 including a polyvinyl alcohol-based resin have excellent adhesiveness to the paper substrate 1 and the vapor-deposited layer 4, the order of the anchor coat layer 2 and the layer 3 including a polyvinyl alcohol-based resin may be reversed. That is, the gas barrier laminate may include a paper substrate 1, a layer 3 including a vinyl alcohol-based resin, an anchor coat layer 2, a vapor-deposited layer 4, and an overcoat layer 5 in order. The anchor coat layer 2 includes a first polyolefin having a polar group, and the overcoat layer 5 includes a second polyolefin having a polar group.

[Paper Substrate]

The paper substrate 1 is not particularly restricted and may be appropriately selected according to the use application of the packaging bag to which the gas barrier laminate 10 is applied. The paper substrate 1 is not particularly restricted as long as it is a paper containing plant-derived pulp as a main component. Specific examples of the paper substrate 1 include high-quality paper, special high-quality paper, coated paper, art paper, cast coated paper, imitation vellum paper, kraft paper, and glassine paper. The thickness of the paper substrate 1 may be, for example, 30 μm or more and 100 μm or less and may be 30 μm or more and 70 μm or less. Furthermore, the thickness of the paper substrate may be 70% or more of the thickness of the entire gas barrier laminate. When the thickness of the paper substrate is 70% or more of the thickness of the entire gas barrier laminate, it can be said that the gas barrier laminate has excellent environmental suitability.

The paper substrate 1 may be provided with at least a coat layer on the side that is in contact with the anchor coat layer 2 that will be described below. By providing a coat layer, the anchor coat layer 2 can be prevented from sinking into the paper, and the coat layer can accomplish a role of a sealer embedding the surface unevenness of the paper so that the anchor coat layer can be uniformly formed without defects. In the coat layer, for example, various copolymers such as a styrene-butadiene-based copolymer, a styrene-acrylic copolymer, and an ethylene-vinyl acetate-based copolymer; a polyvinyl alcohol-based resin, a cellulose-based resin, and paraffin (WAX) are used as binder resins, and for example, clay, kaolin, calcium carbonate, talc, and mica may be included as fillers.

The thickness of a clay coat layer is not particularly restricted; however, the thickness may be, for example, 1 to 10 μm or 3 to 8 μm.

The weight of the paper is preferably 50% by mass or more, more preferably 70% by mass or more, and even more preferably 80% by mass or more, based on the entire gas barrier laminate. When the weight of the paper is 50% by mass or more based on the entire gas barrier laminate, the amount of use of plastic materials can be sufficiently reduced, the gas barrier laminate can be said to be made of paper on the whole, and at the same time, excellent recyclability is obtained.

[Anchor Coat Layer]

The anchor coat layer 2 is provided on the surface of the paper substrate and is provided for the purpose of improving the adhesiveness between the paper substrate 1 and the layer 3 including a polyvinyl alcohol-based resin that will be described below or improving the gas barrier properties of the gas barrier laminate. Such an anchor coat layer 2 has excellent pliability, can suppress cracks in the vapor-deposited layer that will be described below after bending (after folding), and can also improve the adhesiveness between the anchor coat layer and the layer including a polyvinyl alcohol-based resin. In addition, by including the above-mentioned polyolefin, a dense film formed of carboxyl groups and the like can be formed, and a gas barrier laminate having excellent water vapor barrier properties can be obtained.

The first polyolefin having a polar group may have at least one selected from a carboxyl group, a salt of a carboxyl group, a carboxylic acid anhydride group, and a carboxylic acid ester.

As the first polyolefin having a polar group, a product obtained by copolymerizing ethylene or propylene with an unsaturated carboxylic acid (an unsaturated compound having a carboxyl group, such as acrylic acid, methacrylic acid, or maleic anhydride) or an unsaturated carboxylic acid ester, a salt obtained by neutralizing a carboxylic acid with a basic compound, and the like may be used, and in addition to those, products copolymerized with vinyl acetate, an epoxy-based compound, a chlorine-based compound, a urethane-based compound, a polyamide-based compound, and the like may also be used.

Specific examples of the first polyolefin having a polar group include a copolymer of an acrylic acid ester and maleic anhydride, an ethylene-vinyl acetate copolymer, and an ethylene-glycidyl methacrylate copolymer.

The anchor coat layer 2 may include other components in addition to the first polyolefin. Examples of the other components include a polyolefin other than the above-described first polyolefin, a silane coupling agent, an organic titanate, a polyacrylic, a polyester, a polyurethane, a polycarbonate, a polyurea, a polyamide, a polyimide, melamine, and phenol.

The content of the first polyolefin in the anchor coat layer 2 may be, for example, 50% by mass or more, may be 70% by mass or more, may be 90% by mass or more, or may be 100% by mass.

The thickness of the anchor coat layer 2 may be, for example, 1 μm or more, may be 2 μm or more, and may be 5 μm or less. When the thickness of the anchor coat layer 2 is 1 μm or more, surface unevenness of the above-mentioned paper substrate can be efficiently embedded, and the layer including a polyvinyl alcohol-based resin and the vapor-deposited layer, which will be described below, can be uniformly laminated. When the thickness of the anchor coat layer 2 is 5 μm or less, each of the above-described layers can be uniformly laminated while the cost is lowered.

Regarding a method for providing the anchor coat layer 2, the anchor coat layer 2 can be obtained by applying a coating liquid that includes the above-mentioned polyolefin and a solvent on a paper substrate and drying the coating liquid. Examples of the solvent that is included in the coating liquid include water, methyl alcohol, ethyl alcohol, isopropyl alcohol, n-propyl alcohol, n-butyl alcohol, n-pentyl alcohol, dimethyl sulfoxide, dimethylformamide, dimethylacetamide, toluene, hexane, heptane, cyclohexane, acetone, methyl ethyl ketone, diethyl ether, dioxane, tetrahydrofuran, ethyl acetate, and butyl acetate. Regarding these solvents, one kind thereof may be used alone, or two or more kinds thereof may be used in combination. Among these, from the viewpoint of characteristics, methyl alcohol, ethyl alcohol, isopropyl alcohol, toluene, ethyl acetate, methyl ethyl ketone, and water are preferable. Furthermore, from an environmental viewpoint, methyl alcohol, ethyl alcohol, isopropyl alcohol, and water are preferable.

[Layer Including Polyvinyl Alcohol-Based Resin]

The layer 3 including a polyvinyl alcohol-based resin is provided on the surface of the anchor coat layer and is provided for the purpose of improving the adhesiveness between the anchor coat layer 2 and the vapor-deposited layer 4 that will be described below or improving the gas barrier properties (particularly oxygen barrier properties) of the gas barrier laminate. The polyvinyl alcohol-based resin is, for example, a completely saponified polyvinyl alcohol resin, a partially saponified polyvinyl alcohol resin, a modified polyvinyl alcohol resin, or an ethylene-vinyl alcohol copolymer resin. Furthermore, the degree of polymerization of the polyvinyl alcohol-based resin is preferably 300 or higher and 1500 or less. When the degree of polymerization is 300 or higher, the barrier properties and bending resistance of the gas barrier laminate become satisfactory, and when the degree of polymerization is 1500 or less, the viscosity of the coating liquid of the polyvinyl alcohol-based resin that will be described below is lowered, and the coating properties become satisfactory.

Regarding a method for providing the layer 3 including a polyvinyl alcohol-based resin, the layer 3 including a polyvinyl alcohol-based resin can be obtained by applying a coating liquid including the above-mentioned polyvinyl alcohol-based resin and a solvent on the paper substrate 1 and drying the coating liquid. Examples of the solvent that is included in the coating liquid include water, methyl alcohol, ethyl alcohol, isopropyl alcohol, n-propyl alcohol, n-butyl alcohol, n-pentyl alcohol, dimethyl sulfoxide, dimethylformamide, and dimethylacetamide, and particularly a mixed solvent of water and an alcohol such as methyl alcohol, ethyl alcohol, or isopropyl alcohol is preferable. Furthermore, the coating liquid may also include additives such as a surfactant, an antiseptic agent, a storage stabilizer, a silane coupling agent, and an organic titanate.

Such a layer 3 including a polyvinyl alcohol-based resin has excellent pliability, can suppress cracks in the vapor-deposited layer that will be described below after bending (after folding), and at the same time, can improve the adhesiveness between the vapor-deposited layer and the layer including a polyvinyl alcohol-based resin.

The thickness of the layer 3 including a polyvinyl alcohol-based resin may be, for example, 1 μm or more, may be 2 μm or more, and may be 5 μm or less. When the thickness is 1 μm or more, the vapor-deposited layer that will be described below can be uniformly laminated. Furthermore, when the thickness is 5 μm or less, the vapor-deposited layer can be uniformly laminated while the cost is suppressed.

[Vapor-Deposited Layer]

The vapor-deposited layer 4 is a layer produced by vapor-depositing a metal or an inorganic compound. The vapor-deposited layer may be a layer obtained by vapor-depositing aluminum or may also include aluminum oxide ($AlO_x$), silicon oxide ($SiO_x$), and the like.

The thickness of the vapor-deposited layer 4 may be appropriately set according to the use application; however, the thickness may be preferably 30 nm or more or 50 nm or more and may be 100 nm or less or 80 nm or less. When the thickness of the vapor-deposited layer 4 is set to be 30 nm or more, sufficient continuity of the vapor-deposited layer 4 is likely to be obtained, and when the thickness is set to be 100 nm or less, generation of curls and cracks can be sufficiently suppressed, while sufficient gas barrier performance and flexibility are likely to be achieved.

It is preferable that the vapor-deposited layer 4 is formed by a vacuum film-forming means, from the viewpoints of oxygen gas barrier performance and film uniformity. Examples of the film-forming means include known methods such as a vacuum vapor deposition method, a sputtering method, and a chemical vapor deposition method (CVD method); however, from the viewpoint that the film-forming rate is fast and productivity is high, a vacuum vapor deposition method is preferable. Furthermore, among vacuum vapor deposition methods, particularly a film-forming means by electron beam heating is effective from the viewpoint that the film-forming rate is easily suppressed by the area of irradiation, the electron beam current, and the like, and that temperature increase and temperature decrease to the vapor deposition material can be carried out in a short period of time.

[Overcoat Layer]

The overcoat layer 5 is provided on the surface of the vapor-deposited layer 4 so as to be in contact with the vapor-deposited layer 4 and includes a second polyolefin having a polar group.

The second polyolefin having a polar group may have at least one selected from a carboxyl group, a salt of a carboxyl group, a carboxylic acid anhydride group, and a carboxylic acid ester.

As the second polyolefin having a polar group, a product obtained by copolymerizing ethylene or propylene with an unsaturated carboxylic acid (an unsaturated compound having a carboxyl group, such as acrylic acid or methacrylic acid) or an unsaturated carboxylic acid ester, a salt obtained by neutralizing a carboxylic acid with a basic compound, or the like may be used, and in addition to those, products copolymerized with vinyl acetate, an epoxy-based compound, a chlorine-based compound, a urethane-based compound, a polyamide-based compound, with the like may also be used.

As the second polyolefin having a polar group, specifically, a copolymer of an acrylic acid ester and maleic anhydride, an ethylene-vinyl acetate copolymer, an ethylene-glycidyl methacrylate copolymer, and the like may also be used.

Such an overcoat layer 5 has excellent pliability, can suppress cracks in the vapor-deposited layer after bending (after folding), and at the same time, has excellent adhesiveness to the vapor-deposited layer. In addition, by including the above-mentioned second polyolefin, a gas barrier laminate having excellent water vapor barrier properties can be obtained. Furthermore, since the overcoat layer 5 can also take a role as a heat seal layer by including the above-described second polyolefin, it is not necessary to provide a heat seal layer separately.

The overcoat layer 5 may include other components in addition to the second polyolefin. Examples of the other components include a silane coupling agent, an organic titanate, a polyacrylic, a polyester, a polyurethane, a polycarbonate, a polyurea, a polyamide, a polyolefin-based emulsion, a polyimide, melamine, and phenol.

The content of the second polyolefin in the overcoat layer 5 may be, for example, 50% by mass or more, may be 70% by mass or more, may be 90% by mass or more, or may be 100% by mass.

The thickness of the overcoat layer 5 may be, for example, 2 μm or more, may be 3 μm or more, may be 10 μm or less, may be 8 μm or less, or may be 5 μm or less. When the thickness of the overcoat layer 5 is 2 μm or more, the role as the above-mentioned heat seal layer can be sufficiently exhibited. Furthermore, when the thickness of the overcoat layer 5 is 10 μm or less, the adhesiveness to the vapor-deposited layer and the barrier properties can be sufficiently exhibited while the cost is suppressed.

Regarding a method for providing the overcoat layer 5, the overcoat layer 5 can be obtained by applying a coating liquid including the above-mentioned polyolefin and a solvent on the vapor-deposited layer and drying the coating liquid. Examples of the solvent that is included in the coating liquid include water, methyl alcohol, ethyl alcohol, isopropyl alcohol, n-propyl alcohol, n-butyl alcohol, n-pentyl alcohol, dimethyl sulfoxide, dimethylformamide, dimethylacetamide, toluene, hexane, heptane, cyclohexane, acetone, methyl ethyl ketone, diethyl ether, dioxane, tetrahydrofuran, ethyl acetate, and butyl acetate. Regarding these solvents, one kind thereof may be used alone, or two or more kinds thereof may be used in combination. Among these, from the viewpoint of characteristics, methyl alcohol, ethyl alcohol, isopropyl alcohol, toluene, ethyl acetate, methyl ethyl ketone, and water are preferable. Furthermore, from an environmental viewpoint, methyl alcohol, ethyl alcohol, isopropyl alcohol, and water are preferable.

The first polyolefin and the second polyolefin, which are included in the anchor coat layer 2 and the overcoat layer 5, respectively, may be of the same type or may be of different types; however, when the ease of production and the like are considered, it is preferable that the first polyolefin and the second polyolefin are each of the same type.

The gas barrier laminate according to the present embodiment can exhibit sufficient gas barrier properties. The gas barrier properties according to the present specification implies the water vapor transmission rate and oxygen transmission rate are sufficiently low. With regard to the gas barrier laminate according to the present embodiment, it is preferable that the water vapor transmission rate at 40° C. and 90% RH is 2 $g/m^2/d$ or less. Depending on the type of the contents, this value may be 20 $g/m^2/d$ or less. With regard to the gas barrier laminate according to the present embodiment, it is preferable that the oxygen transmission rate at 30° C. and 70% RH is 2 $cc/m^2/d/atm$ or less. Depending on the type of the contents, this value may be 30 $cc/m^2/d/atm$ or less.

Furthermore, the gas barrier laminate according to the present embodiment can exhibit sufficient gas barrier properties even after being folded. With regard to the gas barrier laminate according to the present embodiment, the water vapor transmission rate at 40° C. and 90% RH obtained by folding the gas barrier laminate, with the paper substrate being placed on the outer side, rolling a roller having a weight of 600 g thereon one time, opening the fold, and making measurement, is preferably 3 $g/m^2/d$ or less, and the oxygen transmission rate at 30° C. and 70% RH is preferably 3 $cc/m^2/d/atm$ or less. Furthermore, the water vapor transmission rate at 40° C. and 90% RH obtained by placing the paper substrate on the inner side, rolling a roller having a weight of 600 g thereon one time, opening the fold, and making measurement, is preferably 3 $g/m^2/d$ or less, and the oxygen transmission rate at 30° C. and 70% RH is preferably 3 $cc/m^2/d/atm$ or less.

Thus, an embodiment of the gas barrier laminate according to the present embodiment has been described; however, the present invention may also include other gas barrier laminates. For example, the layer including a polyvinyl alcohol-based resin may be disposed between the paper substrate and the anchor coat layer. That is, the layer including a polyvinyl alcohol-based resin may be disposed between the paper substrate and the anchor coat layer or between the anchor coat layer and the vapor-deposited layer.

<Packaging Bag>

Figure 2:
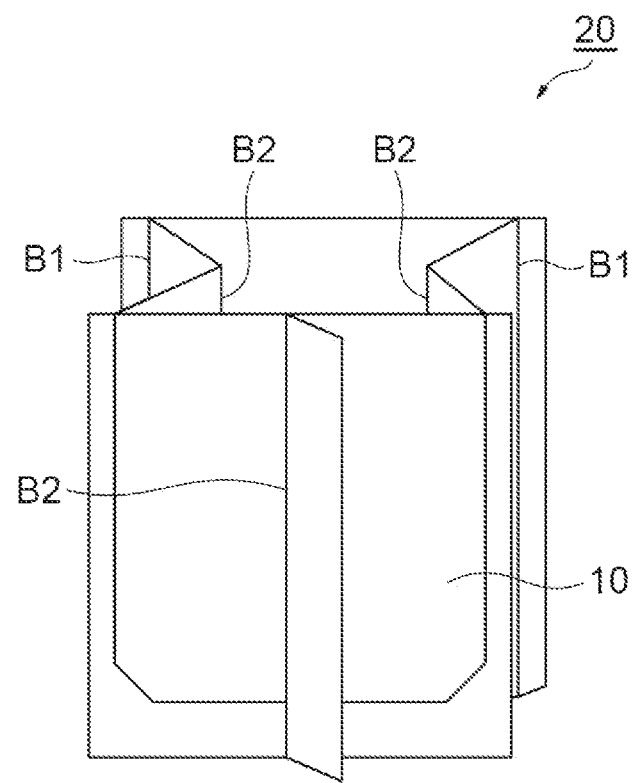
FIG. 2 is a perspective view illustrating a packaging bag according to an embodiment of the present invention.

FIG. 2 is a perspective view illustrating a gusset bag 20 formed from the gas barrier laminate 10. A packaging bag is produced by sealing an opening part in the upper part of the gusset bag 20. The gusset bag 20 has a site where the gas barrier laminate 10 is folded (folding parts B1 and B2). A folding part B1 is a site where the gas barrier laminate 10 is valley-folded as viewed from the innermost layer side, and a folding part B2 is a site where the gas barrier laminate 10 is mountain-folded as viewed from the innermost layer side.

The packaging bag may be formed into a bag shape by folding one sheet of a gas barrier laminate in two such that the two parts of the overcoat layer 5 face each other, subsequently appropriately folding the gas barrier laminate into a desired shape, and then heat-sealing the resultant, or may be formed into a bag shape by superposing two sheets of a gas barrier laminate such that the overcoat layers 5 face each other, and then heat-sealing the gas barrier laminates.

With regard to the packaging bag according to the present embodiment, the heat seal strength may be 2 N or greater or may be 4 N or greater. Incidentally, the upper limit value of the heat seal strength is not particularly limited; however, the upper limit value may be, for example, 10 N or less.

Here, the heat seal strength is a value obtained by superposing two sheets of a gas barrier laminate 10 such that layers 3 including a polyolefin face each other, performing heat sealing with a heat sealer under the conditions of 120° C., 0.2 MPa, and 1 second, cutting the resultant into a strip having a width of 15 mm, and measuring the maximum load when the strip is subjected to T-shape peeling at a peeling rate of 300 mm/min.

The packaging bag can accommodate contents such as foods and medicines as contents. Particularly for foods, the packaging bag is suitable for accommodating confectionery and the like. The packaging bag according to the present embodiment can maintain high gas barrier properties even when the packaging bag has a shape with folding parts.

Incidentally, in the present embodiment, a gusset bag has been mentioned as an example of the packaging bag; however, the gas barrier laminate according to the present embodiment may also be used to produce, for example, a pillow bag, a three-sided sealed bag, or a standing pouch.

EXAMPLES

Hereinafter, the present invention will be described in more detail by way of Examples; however, the present invention is not intended to be limited to these examples.

<Production of Gas Barrier Laminate>

Example 1

A coating liquid including a salt of a carboxyl group (trade name: CHEMIPEARL S500, manufactured by Mitsui Chemicals, Inc.) was applied on the surface of paper (clay-coated paper, thickness of paper: 50 μm, thickness of clay coat layer: 5 μm) with a bar coater and was dried in an oven to form an anchor coat layer. The thickness of the layer was 3 μm. Subsequently, a coating liquid including a polyvinyl alcohol resin obtained by dissolving a polyvinyl alcohol resin having a degree of saponification of 98% and a degree of polymerization of 500 in a solution of water/IPA=8/2 at a solid content concentration of 10% by mass, was applied on the anchor coat layer with a bar coater and was dried in an oven to form a layer including a polyvinyl alcohol resin. The thickness of the layer was 1 μm. Subsequently, AL vapor deposition was applied on the layer including a polyvinyl alcohol resin. The thickness of the AL vapor-deposited layer was 50 nm. Thereafter, a coating liquid including a salt of a carboxyl group (trade name: CHEMIPEARL S500, manufactured by Mitsui Chemicals, Inc.) was applied on the vapor-deposited layer with a bar coater and was dried in an oven to form an overcoat layer, and a gas barrier laminate was obtained. The thickness of the layer including a polyolefin was 3 μm. The weight of paper in the gas barrier laminate was 81% by mass.

Example 2

A gas barrier laminate was obtained by an operation similar to that in Example 1, except that the thickness of the anchor coat layer was set to 1 μm, and the thickness of the layer including a polyvinyl alcohol resin was set to 5 μm. The weight of paper in the gas barrier laminate was 78% by mass.

Example 3

A gas barrier laminate was obtained by an operation similar to that in Example 1, except that the thickness of the anchor coat layer was set to 5 μm. The weight of paper in the gas barrier laminate was 78% by mass.

Example 4

A gas barrier laminate was obtained by an operation similar to that in Example 1, except that the thickness of the vapor-deposited layer was set to 30 nm. The weight of paper in the gas barrier laminate was 81% by mass.

Example 5

A gas barrier laminate was obtained by an operation similar to that in Example 1, except that the thickness of the vapor-deposited layer was set to 100 nm. The weight of paper in the gas barrier laminate was 81% by mass.

Example 6

A gas barrier laminate was obtained by an operation similar to that in Example 1, except that the thickness of the overcoat layer was set to 2 μm. The weight of paper in the gas barrier laminate was 82% by mass.

Example 7

A gas barrier laminate was obtained by an operation similar to that of Example 1, except that the thickness of the overcoat layer was set to 10 μm. The weight of paper in the gas barrier laminate was 72% by mass.

Example 8

A gas barrier laminate was obtained by an operation similar to that in Example 1, except that paper (clay-coated paper, thickness of paper: 30 μm, thickness of clay coat layer: 5 μm) was used. The weight of paper in the gas barrier laminate was 71% by mass.

Example 9

A gas barrier laminate was obtained by an operation similar to that in Example 1, except that paper (clay-coated paper, thickness of paper: 100 μm, thickness of clay coat layer: 5 μm) was used. The weight of paper in the gas barrier laminate was 90% by mass.

Example 10

A gas barrier laminate was obtained by an operation similar to that in Example 1, except that the vapor-deposited layer was formed with silica, and the thickness of the vapor-deposited layer was set to 30 nm. The weight of paper in the gas barrier laminate was 82% by mass.

Example 11

A gas barrier laminate was obtained by an operation similar to that in Example 1, except that the vapor-deposited layer was formed with alumina, and the thickness of the vapor-deposited layer was set to 30 nm. The weight of paper in the gas barrier laminate was 81% by mass.

Example 12

A gas barrier laminate was obtained by an operation similar to that in Example 1, except that the anchor coat layer was produced by preparing a coating liquid by neutralizing a polyolefin resin including a copolymer of an acrylic acid ester and maleic anhydride (trade name: BONDINE HX-8290, manufactured by Arkema S.A.) with triethylamine in a water/IPA mixed solvent, and applying the coating liquid with a bar coater.

Example 13

A polyolefin resin including a copolymer of an acrylic acid ester and maleic anhydride (trade name: BONDINE HX-8290, manufactured by Arkema S.A.) was neutralized with triethylamine in a water/IPA mixed solvent to prepare an aqueous polyolefin dispersion. A gas barrier laminate was obtained by an operation similar to that in Example 1, except that the obtained coating liquid was applied with a bar coater and dried in an oven to produce an overcoat layer.

Example 14

A gas barrier laminate was obtained by an operation similar to that in Example 1, except that a coating liquid formed from an ethylene-vinyl acetate copolymer (trade name: CHEMIPEARL V300, manufactured by Mitsui Chemicals, Inc.) was applied with a bar coater and dried in an oven to form an anchor coat layer.

Example 15

A gas barrier laminate was obtained by an operation similar to that in Example 1, except that a coating liquid formed from an ethylene-vinyl acetate copolymer (trade name: CHEMIPEARL V300, manufactured by Mitsui Chemicals, Inc.) was applied with a bar coater and dried in an oven to form an overcoat layer.

Example 16

A gas barrier laminate was obtained by an operation similar to that in Example 1, except that a coating liquid of an ethylene-glycidyl methacrylate copolymer (trade name: SEPOLSION G515, manufactured by SUMITOMO CHEMICAL COMPANY, LIMITED) was applied with a bar coater and dried in an oven to form an anchor coat layer.

Example 17

A gas barrier laminate was obtained by an operation similar to that in Example 1, except that a coating liquid of an ethylene-glycidyl methacrylate copolymer (trade name: SEPOLSION G515, manufactured by SUMITOMO CHEMICAL COMPANY, LIMITED) was applied with a bar coater and dried in an oven to form an overcoat layer.

Example 18

A gas barrier laminate was obtained by an operation similar to that in Example 1, except that a coating liquid including a salt of a carboxyl group (trade name: CHEMIPEARL S100, manufactured by Mitsui Chemicals, Inc.) was applied with a bar coater and dried in an oven to form an anchor coat layer.

Example 19

A coating liquid including a polyvinyl alcohol resin obtained by dissolving a polyvinyl alcohol resin having a degree of saponification of 98% and a degree of polymerization of 500 in a solution of water/IPA=8/2 at a solid content concentration of 10% by mass, was applied on the surface of paper (clay-coated paper, thickness of paper: 50 thickness of clay coat layer: 5 μm) with a bar coater and was dried in an oven to form an anchor coat layer including a polyvinyl alcohol resin. The thickness of the layer was 1 Subsequently, a coating liquid including a salt of a carboxyl group (trade name: CHEMIPEARL S500, manufactured by Mitsui Chemicals, Inc.) was applied on the anchor coat layer with a bar coater and was dried in an oven to form a polyolefin layer including a salt of a carboxyl group. The thickness of the layer was 3 Subsequently, AL vapor deposition was applied on the layer including a salt of a carboxyl group. The thickness of the AL vapor-deposited layer was 50 nm. Thereafter, a coating liquid including a salt of a carboxyl group (trade name: CHEMIPEARL S500, manufactured by Mitsui Chemicals, Inc.) was applied on the vapor-deposited layer with a bar coater and was dried in an oven to form an overcoat layer, and a gas barrier laminate was obtained. The thickness of the layer including a polyolefin was 3 The weight of paper in the gas barrier laminate was 81% by mass.

Comparative Example 1

A gas barrier laminate was obtained by an operation similar to that in Example 1, except that a vapor-deposited layer was not provided. The weight of paper in the gas barrier laminate was 81% by mass.

Comparative Example 2

A coating liquid including an acrylic alkyd resin was applied on the surface of paper (clay-coated paper, thickness of paper: 50 μm, thickness of clay coat layer: 5 μm) with a bar coater and was dried in an oven to form a layer including an acrylic alkyd resin. The thickness of the layer was 4 Subsequently, AL vapor deposition was applied on this layer. The thickness of the AL vapor-deposited layer was 50 nm. Thereafter, a coating liquid including a polyvinyl alcohol resin and TEOS was applied on the AL vapor-deposited layer with a bar coater and dried in an oven to form a layer including a polyvinyl alcohol resin and TEOS. The thickness of the layer was 0.4 Thereafter, a solution including a salt of a carboxyl group (trade name: CHEMIPEARL S500, manufactured by Mitsui Chemicals, Inc.) was applied with a bar coater and dried in an oven to form a layer including a polyolefin, and a gas barrier laminate was obtained. The thickness of the layer including a polyolefin was 3 The weight of paper in the gas barrier laminate was 80% by mass.

Comparative Example 3

A coating liquid including a urethane-curable acrylic resin was applied on the surface of paper (clay-coated paper, thickness of paper: 50 μm, thickness of clay-coated layer: 5 μm) with a bar coater and dried in an oven to form a layer including an ethylene-vinyl acetate copolymer. The thickness of the layer was 3 μm. Subsequently, AL vapor deposition was applied on the layer including an ethylene-vinyl acetate copolymer. The thickness of the AL vapor-deposited layer was 50 nm. Subsequently, a coating liquid including a salt of a carboxyl group (trade name: CHEMIPEARL S500, manufactured by Mitsui Chemicals, Inc.) was applied on the vapor-deposited layer with a bar coater and dried in an oven to form a layer including a polyolefin, and a gas barrier laminate was obtained. The thickness of the layer including a polyolefin was 3 μm. The weight of paper in the gas barrier laminate was 82% by mass.

Comparative Example 4

A coating liquid including a salt of a carboxyl group (trade name: CHEMIPEARL S500, manufactured by Mitsui Chemicals, Inc.) was applied on the surface of paper (clay-coated paper, thickness of paper: 50 μm, thickness of clay coat layer: 5 μm) with a bar coater and was dried in an oven to form an anchor coat layer. The thickness of the layer was 3 μm. Subsequently, AL vapor deposition was applied on the anchor coat layer. The thickness of the AL vapor-deposited layer was 50 nm. Thereafter, a coating liquid including a polyvinyl alcohol resin was applied on the AL vapor-deposited layer with a bar coater and dried in an oven to form a layer including a polyvinyl alcohol resin. The thickness of the layer was 1 μm. Thereafter, a solution including a salt of a carboxyl group (trade name: CHEMIPEARL S500, manufactured by Mitsui Chemicals, Inc.) was applied with a bar coater and dried in an oven to form an overcoat layer, and a gas barrier laminate was obtained. The thickness of the overcoat layer was 3 μm. The weight of paper in the gas barrier laminate was 81% by mass.

<Measurement of Water Vapor Transmission Rate>

The water vapor transmission rates of the gas barrier laminates according to Examples and Comparative Examples were measured by a MOCON method. The measurement conditions were set to a temperature of 40° C. and a relative humidity of 90%. A gas barrier laminate was creased while a roller weighing 600 g was rolled at a rate of 300 mm/min, and the water vapor transmission rate of the gas barrier laminate after opening was also similarly measured. Incidentally, the term "inward folding" in Table 1 to Table 7 means a gas barrier laminate after mountain-folding the gas barrier laminate as viewed from the paper substrate side, and the term "outward folding" indicates a gas barrier laminate after valley-folding the gas barrier laminate as viewed from the paper substrate side. The results are expressed in the unit of [g/m$^2$·day] in Table 1 to Table 7.

<Measurement of Oxygen Transmission Rate>

The oxygen transmission rates of the gas barrier laminates according to Examples and Comparative Examples were measured by JIS K7126, method B (isopiestic method). As the measurement apparatus, OXTRAN 2/20 manufactured by Modern Controls, Inc. was used, and measurement was made at a temperature of 30° C. and a relative humidity of 70%. The results are expressed in the unit of [cc/m$^2$/d/atm] in Table 1 to Table 7.

<Measurement of Heat Seal Strength>

Two sheets of a gas barrier laminate were superposed such that the layers including a polyolefin faced each other, heat-sealing was performed with a heat sealer under the conditions of 120° C., 0.2 MPa, and 1 second, a strip having a width of 15 mm was cut out therefrom, and the maximum load when the strip was subjected to T-shape peeling at a peeling rate of 300 mm/min was measured. The results are expressed in the unit of [N/15 mm] in Table 1 to Table 7.

TABLE 1

|  |  | Example 1 | Example 2 | Example 3 |
|---|---|---|---|---|
| Paper substrate (thickness) |  | Clay-coated paper (paper + clay coat: 50 μm + 5 μm) | Clay-coated paper (paper + clay coat: 50 μm + 5 μm) | Clay-coated paper (paper + clay coat: 50 μm + 5 μm) |
| Anchor coat layer (thickness) |  | CHEMIPEARL S500 (3 μm) | CHEMIPEARL S500 (1 μm) | CHEMIPEARL S500 (5 μm) |
| Layer including polyvinyl alcohol-based resin (thickness) |  | Polyvinyl alcohol (1 μm) | Polyvinyl alcohol (5 μm) | Polyvinyl alcohol (1 μm) |
| Vapor-deposited layer (thickness) |  | AL (50 nm) | AL (50 nm) | AL (50 nm) |
| Overcoat layer (thickness) |  | CHEMIPEARL S500 (3 μm) | CHEMIPEARL S500 (3 μm) | CHEMIPEARL S500 (3 μm) |
| Ratio of thickness of layer of paper substrate (%) |  | 81 | 78 | 78 |
| Water vapor transmission rate | Initial | 1.2 | 2.0 | 1.6 |
|  | Inward folding | 1.8 | 2.1 | 2.0 |
|  | Outward folding | 2.5 | 2.1 | 2.0 |
| Oxygen transmission rate | Initial | 0.9 | 0.6 | 1.7 |
|  | Inward folding | 1.2 | 0.8 | 2.1 |
|  | Outward folding | 2.0 | 1.2 | 2.1 |
| Heat seal strength |  | 5.6 | 6.1 | 5.9 |

TABLE 2

|  |  | Example 4 | Example 5 | Example 6 |
|---|---|---|---|---|
| Paper substrate (thickness) |  | Clay-coated paper (paper + clay coat: 50 μm + 5 μm) | Clay-coated paper (paper + clay coat: 50 μm + 5 μm) | Clay-coated paper (paper + clay coat: 50 μm + 5 μm) |
| Anchor coat layer (thickness) |  | CHEMIPEARL S500 (3 μm) | CHEMIPEARL S500 (3 μm) | CHEMIPEARL S500 (3 μm) |
| Layer including polyvinyl alcohol-based resin (thickness) |  | Polyvinyl alcohol (1 μm) | Polyvinyl alcohol (1 μm) | Polyvinyl alcohol (1 μm) |
| Vapor-deposited layer (thickness) |  | AL (30 nm) | AL (100 nm) | AL (50 nm) |
| Overcoat layer (thickness) |  | CHEMIPEARL S500 (3 μm) | CHEMIPEARL S500 (3 μm) | CHEMIPEARL S500 (2 μm) |
| Ratio of thickness of layer of paper substrate (%) |  | 81 | 81 | 82 |
| Water vapor transmission rate | Initial | 2.0 | 0.9 | 1.3 |
|  | Inward folding | 2.5 | 1.0 | 1.5 |
|  | Outward folding | 3.0 | 1.3 | 2.2 |
| Oxygen transmission rate | Initial | 1.1 | 0.5 | 1.0 |
|  | Inward folding | 1.3 | 0.7 | 1.4 |
|  | Outward folding | 1.2 | 0.7 | 1.9 |
| Heat seal strength |  | 4.9 | 5.2 | 4.0 |

TABLE 3

|  |  | Example 7 | Example 8 | Example 9 | Example 10 | Example 11 |
|---|---|---|---|---|---|---|
| Paper substrate (thickness) | | Clay-coated paper (paper + clay coat: 50 μm + 5 μm) | Clay-coated paper (paper + clay coat: 30 μm + 5 μm) | Clay-coated paper (paper + clay coat: 100 μm + 5 μm) | Clay-coated paper (paper + clay coat: 50 μm + 5 μm) | Clay-coated paper (paper + clay coat: 50 μm + 5 μm) |
| Anchor coat layer (thickness) | | CHEMIPEARL S500 (3 μm) | CHEMIPEARL S500 (3 μm) | CHEMIPEARL S500 (3 μm) | CHEMIPEARL S500 (3 μm) | CHEMIPEARL S500 (3 μm) |
| Layer including polyvinyl alcohol-based resin (thickness) | | Polyvinyl alcohol (1 μm) | Polyvinyl alcohol (1 μm) | Polyvinyl alcohol (1 μm) | Polyvinyl alcohol (1 μm) | Polyvinyl alcohol (1 μm) |
| Vapor-deposited layer (thickness) | | AL (50 nm) | AL (50 nm) | AL (50 nm) | Silica (30 nm) | Alumina (30 nm) |
| Overcoat layer (thickness) | | CHEMIPEARL S500 (10 μm) | CHEMIPEARL S500 (3 μm) | CHEMIPEARL S500 (3 μm) | CHEMIPEARL S500 (3 μm) | CHEMIPEARL S500 (3 μm) |
| Ratio of thickness of layer of paper substrate (%) | | 72 | 71 | 90 | 82 | 81 |
| Water vapor transmission rate | Initial | 1.3 | 1.5 | 1.6 | 0.9 | 1.9 |
| | Inward folding | 1.8 | 2.2 | 1.8 | 1.4 | 2.0 |
| | Outward folding | 2.3 | 2.5 | 2.3 | 1.8 | 2.2 |
| Oxygen transmission rate | Initial | 1.2 | 1.4 | 1.3 | 0.7 | 0.9 |
| | Inward folding | 2.3 | 1.9 | 1.5 | 0.9 | 1.5 |
| | Outward folding | 2.8 | 2.2 | 2.0 | 1.1 | 2.0 |
| Heat seal strength | | 6.7 | 5.1 | 4.8 | 4.6 | 5.0 |

TABLE 4

|  |  | Example 12 | Example 13 | Example 14 | Example 15 |
|---|---|---|---|---|---|
| Paper substrate (thickness) | | Clay-coated paper (paper + clay coat: 50 μm + 5 μm) | Clay-coated paper (paper + clay coat: 50 μm + 5 μm) | Clay-coated paper (paper + clay coat: 50 μm + 5 μm) | Clay-coated paper (paper + clay coat: 50 μm + 5 μm) |
| Anchor coat layer (thickness) | | BONDINE HX-8290 (3 μm) | CHEMIPEARL S500 (3 μm) | CHEMIPEARL V300 (3 μm) | CHEMIPEARL S500 (3 μm) |
| Layer including polyvinyl alcohol-based resin (thickness) | | Polyvinyl alcohol (1 μm) | Polyvinyl alcohol (1 μm) | Polyvinyl alcohol (1 μm) | Polyvinyl alcohol (1 μm) |
| Vapor-deposited layer (thickness) | | AL (50 nm) | AL (50 nm) | AL (50 nm) | AL (50 nm) |
| Overcoat layer (thickness) | | CHEMIPEARL S500 (3 μm) | BONDINE HX-8290 (3 μm) | CHEMIPEARL S500 (3 μm) | CHEMIPEARL V300 (3 μm) |
| Ratio of thickness of layer of paper substrate | | 81 | 81 | 81 | 81 |
| Water vapor transmission rate | Initial | 1.2 | 1.6 | 2.0 | 1.5 |
| | Inward folding | 4.2 | 2.4 | 13 | 1.6 |
| | Outward folding | 5.4 | 2.4 | 15 | 1.9 |
| Oxygen transmission rate | Initial | 1.6 | 1.3 | 1.8 | 1.9 |
| | Inward folding | 5.2 | 1.3 | 20 | 1.8 |
| | Outward folding | 6.2 | 1.6 | 25 | 2.4 |
| Heat seal strength | | 4.5 | 3.9 | 3.8 | 4.3 |

TABLE 5

|  | Example 16 | Example 17 | Example 18 |
|---|---|---|---|
| Paper substrate (thickness) | Clay-coated paper (paper + clay coat: 50 μm + 5 μm) | Clay-coated paper (paper + clay coat: 30 μm + 5 μm) | Clay-coated paper (paper + clay coat: 50 μm + 5 μm) |
| Anchor coat layer (thickness) | SEPOLSION G515 (3 μm) | CHEMIPEARL S500 (3 μm) | CHEMIPEARL S100 (3 μm) |
| Layer including polyvinyl alcohol-based resin (thickness) | Polyvinyl alcohol (1 μm) | Polyvinyl alcohol (1 μm) | Polyvinyl alcohol (1 μm) |

TABLE 5-continued

|  |  | Example 16 | Example 17 | Example 18 |
|---|---|---|---|---|
| Vapor-deposited layer (thickness) | | AL (50 nm) | AL (50 nm) | AL (51 nm) |
| Overcoat layer (thickness) | | CHEMIPEARL S500 (3 μm) | SEPOLSION G515 (3 μm) | CHEMIPEARL S500 (3 μm) |
| Ratio of thickness of layer of paper substrate (%) | | 81 | 81 | 81 |
| Water vapor transmission rate | Initial | 1.9 | 2.0 | 2.3 |
| | Inward folding | 11 | 2.0 | 2.4 |
| | Outward folding | 12 | 2.3 | 3.5 |
| Oxygen transmission rate | Initial | 1.6 | 2.1 | 1.8 |
| | Inward folding | 13 | 2.0 | 1.8 |
| | Outward folding | 11 | 2.1 | 3.4 |
| Heat seal strength | | 3.8 | 3.5 | 4.4 |

TABLE 6

|  |  | Example 19 |
|---|---|---|
| Paper substrate (thickness) | | Clay-coated paper (paper + clay coat: 50 μm + 5 μm) |
| Layer including polyvinyl alcohol-based resin (thickness) | | Polyvinyl alcohol (1 μm) |
| Anchor coat layer (thickness) | | CHEMIPEARL S500 (3 μm) |
| Vapor-deposited layer (thickness) | | AL (50 nm) |
| Overcoat layer (thickness) | | CHEMIPEARL S500 (3 μm) |
| Ratio of thickness of layer of paper substrate (%) | | 81 |
| Water vapor transmission rate | Initial | 1.5 |
| | Inward folding | 1.6 |
| | Outward folding | 1.9 |
| Oxygen transmission rate | Initial | 2.0 |
| | Inward folding | 2.3 |
| | Outward folding | 2.5 |
| Heat seal strength | | 4.2 |

TABLE 7

|  |  | Comparative Example 1 | Comparative Example 2 | Comparative Example 3 | Comparative Example 4 |
|---|---|---|---|---|---|
| Layer configuration (thickness) | | Clay-coated paper (paper + clay coat: 50 μm + 5 μm) CHEMIPEARL S500 (3 μm) Polyvinyl alcohol (1 μm) CHEMIPEARL S500 (3 μm) | Clay-coated paper (paper + clay coat: 50 μm + 5 μm) Acrylic alkyd resin (4 μm) AL (50 nm) PVA + TEOS (0.4 μm) CHEMIPEARL S500 (3 μm) | Clay-coated paper (paper + clay coat: 50 μm + 5 μm) Urethane-curable acrylic resin (3 μm) AL (50 nm) CHEMIPEARL S500 (3 μm) | Clay-coated paper (paper + clay coat: 50 μm + 5 μm) CHEMIPEARL S500 (3 μm) AL (50 nm) Polyvinyl alcohol (1 μm) CHEMIPEARL S500 (3 μm) |
| Ratio of thickness of layer of paper substrate (%) | | 81 | 80 | 82 | 81 |
| Water vapor transmission rate | Initial | 110 | 3.0 | 2.1 | 1.5 |
| | Inward folding | 150 | 5.0 | 10 | 1.6 |
| | Outward folding | 160 | 15 | 21 | 2.0 |
| Oxygen transmission rate | Initial | 25 | 5.0 | 150 | 50 |
| | Inward folding | 25 | 150 | 150 | 60 |
| | Outward folding | 25 | 150 | 150 | 60 |
| Heat seal strength | | 4.7 | 3.6 | 3.8 | 3.4 |

REFERENCE SIGNS LIST

1: paper substrate, 2: anchor coat layer, 3: layer including polyvinyl alcohol-based resin, 4: vapor-deposited layer, 5: overcoat layer, 10: gas barrier laminate, 20: gusset bag, B1, B2: folding part.

The invention claimed is:

1. A gas barrier laminate comprising, in following order:
a paper substrate;
an anchor coat layer including a first polyolefin having a polar group;
a vapor-deposited layer; and
an overcoat layer including a second polyolefin having a polar group,
wherein the gas barrier laminate further comprises a resin layer that includes a polyvinyl alcohol-based resin between the paper substrate and the anchor coat layer or between the anchor coat layer and the vapor-deposited layer, and
wherein a thickness of the anchor coat layer is 1 μm or more and 5 μm or less, and a thickness of the resin layer is 1 μm or more and 5 μm or less.

2. The gas barrier laminate according to claim 1, wherein the first polyolefin having a polar group has at least one selected from a carboxyl group, a salt of a carboxyl group, a carboxylic acid anhydride group, and a carboxylic acid ester.

3. The gas barrier laminate according to claim 1, wherein the second polyolefin having a polar group has at least one selected from a carboxyl group, a salt of a carboxyl group, a carboxylic acid anhydride group, and a carboxylic acid ester.

4. The gas barrier laminate according to claim 1, wherein the first polyolefin having a polar group is a copolymer of an acrylic acid ester and maleic anhydride.

5. The gas barrier laminate according to claim 1, wherein the first polyolefin having a polar group is an ethylene-vinyl acetate copolymer.

6. The gas barrier laminate according to claim 1, wherein the first polyolefin having a polar group is an ethylene-glycidyl methacrylate copolymer.

7. The gas barrier laminate according to claim 1, wherein the second polyolefin having a polar group is a copolymer of an acrylic acid ester and maleic anhydride.

8. The gas barrier laminate according to claim 1, wherein the second polyolefin having a polar group is an ethylene-vinyl acetate copolymer.

9. The gas barrier laminate according to claim 1, wherein the second polyolefin having a polar group is an ethylene-glycidyl methacrylate copolymer.

10. The gas barrier laminate according to claim 1, wherein a thickness of the vapor-deposited layer is 30 nm or more and 100 nm or less.

11. The gas barrier laminate according to claim 1, wherein a thickness of the overcoat layer is 2 μm or more and 10 μm or less.

12. The gas barrier laminate according to claim 1, wherein a thickness of the paper substrate is 30 μm or more and 100 μm or less, and the thickness of the paper substrate is 70% or more of a thickness of the entire gas barrier laminate.

13. The gas barrier laminate according to claim 1, wherein a weight of paper is 50% by mass or more based on the entire gas barrier laminate.

14. A packaging bag comprising the gas barrier laminate according to claim 1.

15. The packaging bag according to claim 14, having a folding part.

16. A gas barrier laminate comprising, in following order:
a paper substrate;
a resin layer including a polyvinyl alcohol-based resin;
an anchor coat layer including a first polyolefin having a polar group;
a vapor-deposited layer; and
an overcoat layer including a second polyolefin having a polar group,
wherein a thickness of the anchor coat layer is 1 μm or more and 5 μm or less, and a thickness of the resin layer is 1 μm or more and 5 μm or less,
wherein the resin layer has a first surface that contacts the paper substrate and a second surface that contacts the anchor coat layer, and
wherein the anchor coat layer has a first surface that contacts the resin layer and a second surface that contacts the vapor-deposited layer.

17. A gas barrier laminate comprising, in following order:
a paper substrate;
an anchor coat layer including a first polyolefin having a polar group;
a resin layer including a polyvinyl alcohol-based resin;
a vapor-deposited layer; and
an overcoat layer including a second polyolefin having a polar group,
wherein a thickness of the anchor coat layer is 1 μm or more and 5 μm or less, and a thickness of the resin layer is 1 μm or more and 5 μm or less,
wherein the anchor coat layer has a first surface that contacts the paper substrate and a second surface that contacts the resin layer, and
wherein the resin layer has a first surface that contacts the anchor coat layer and a second surface that contacts the vapor-deposited layer.

* * * * *